US011862414B1

(12) United States Patent
Zeng et al.

(10) Patent No.: US 11,862,414 B1
(45) Date of Patent: Jan. 2, 2024

(54) ROCKER DEVICE AND HANDLE CONTROLLER

(71) Applicant: GUANGDONG K-SILVER INDUSTRIAL CO., LTD., Shenzhen (CN)

(72) Inventors: Xiao Zeng, Shenzhen (CN); Jianbo Zhao, Shenzhen (CN)

(73) Assignee: GUANGDONG K-SILVER INDUSTRIAL CO., LTD., Shenzhen (CN)

(*) Notice: Subject to any disclaimer, the term of this patent is extended or adjusted under 35 U.S.C. 154(b) by 0 days.

(21) Appl. No.: 17/994,122

(22) Filed: Nov. 25, 2022

(30) Foreign Application Priority Data

Sep. 29, 2022 (CN) ......................... 202222599890.5

(51) Int. Cl.
*H01H 23/16* (2006.01)
*H01H 23/28* (2006.01)
*H01H 23/04* (2006.01)

(52) U.S. Cl.
CPC ............ *H01H 23/16* (2013.01); *H01H 23/04* (2013.01); *H01H 23/28* (2013.01)

(58) Field of Classification Search
CPC .... H01H 23/143; H01H 23/30; H01H 23/025; H01H 2300/03; H01H 23/145; H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26
See application file for complete search history.

(56) References Cited

U.S. PATENT DOCUMENTS

| | | | | |
|---|---|---|---|---|
| 7,576,293 | B2 * | 8/2009 | Nagai | H01H 23/162 200/310 |
| 10,770,247 | B1 * | 9/2020 | Wu | H01H 23/04 |
| 11,042,179 | B1 * | 6/2021 | Muranaka | G05G 5/005 |
| 2018/0122600 | A1 * | 5/2018 | Jansen | H01H 23/025 |

* cited by examiner

*Primary Examiner* — Ahmed M Saeed
(74) *Attorney, Agent, or Firm* — Westbridge IP LLC

(57) ABSTRACT

Disclosed are a rocker device and a handle controller. The rocker device includes a mounting seat assembly, an electric control board, an upper shell and a bottom shell. The mounting seat assembly is provided with a first groove and an arc-shaped groove for mounting the rocker arm assembly. The electric control board is disposed in the first groove, and the upper shell covers a top area of the mounting seat assembly. The upper shell fixes two ends of the rocker arm assembly in the arc-shaped groove and confines the electric control board to the first groove. A first connecting portion is also provided on an outer periphery of the upper shell. The mounting seat assembly is disposed in the bottom shell, and the bottom shell is clamped with the first connecting portion.

12 Claims, 9 Drawing Sheets

ROCKER DEVICE AND HANDLE CONTROLLER

CROSS-REFERENCE TO RELATED APPLICATIONS

This application claims priority to Chinese Patent Application No. 202222599890.5, filed on Sep. 29, 2022, the entire contents of which are incorporated herein by reference.

TECHNICAL FIELD

The present disclosure relates to the technical field of remote control, and in particular, to a rocker device and a handle controller.

BACKGROUND

The rocker device, as an input device, is usually used for drone operation handles, game-pads, etc. The rocker device mainly includes a rocker and two swing arm assemblies. The rocker is toggled to drive the swing arm assembly to operate, and the potential adjustment module located on the electronic control board can output a specific resistance or voltage. During the working process, the rocker is usually shaken in different directions, representing different commands. In addition, the rocker device includes a bottom shell and an upper shell. The upper shell, the electric control board and the two swing arm assemblies all need to be connected with the bottom shell. The structure of the bottom shell is complicated, and the manufacture of the bottom shell is difficult. In addition, most of the components are installed on the bottom shell, resulting in low assembly efficiency and inconvenient assembly. Finally, the assembly connection between the various components is not firm, making it easy for the rocker device to shake during use.

SUMMARY

The main objective of the present disclosure is to provide a rocker device, aiming to optimize the installation structure of the rocker device.

To achieve the above purpose, the present disclosure provides a rocker device, including a rocker, a rocker arm assembly, a mounting seat assembly, an electric control board, an upper shell and a bottom shell.

In an embodiment, the rocker arm assembly is sleeved on the rocker, and is pushed by the rocker to swing in a first direction and a second direction perpendicular to the first direction, the mounting seat assembly includes a first groove and an arc-shaped groove for the rocker arm assembly, the electric control board is disposed in the first groove, the upper shell covers a top area of the mounting seat assembly, fixes two ends of the rocker arm assembly in the arc-shaped groove, and confines the electric control board in the first groove. A first connecting portion is disposed on an outer periphery of the upper shell. The mounting seat assembly is disposed in the bottom shell, and the bottom shell is clamped with the first connecting portion.

In an embodiment, the mounting seat assembly includes a base, a first protruding portion and a clamping block.

In an embodiment, the first protruding portion and the clamping block are disposed on a same side of the base, and the arc-shaped groove is formed on one side of the first protruding portion and the clamping block away from the base.

In an embodiment, an elastic sheet is disposed on one side of the electric control board away from the base, the clamping block is movably installed on the upper shell corresponding to the elastic sheet, and when the rocker arm assembly is driven by the rocker to press down, the elastic sheet is pressed by the clamping block to be deformed and make the elastic sheet contact with the electric control board to form a loop.

In an embodiment, the mounting seat assembly includes three first protruding portions, the clamping block and the three first protruding portions are evenly spaced along the circumference of the base, and the rocket arm assembly is pushed by the rocker to swing in the first direction and the second direction perpendicular to the first direction.

In an embodiment, the first protruding portion and an abutting surface of the upper shell are inclined.

In an embodiment, the first connecting portion is a clamping portion, and the bottom shell is provided with a clamping groove engaged with the clamping portion.

In an embodiment, the first connecting portion is provided with a clamping groove, and the bottom shell is provided with a clapping portion engaged with the clamping groove.

In an embodiment, the bottom shell includes a bottom plate and a side plate connected to the bottom plate.

In an embodiment, the mounting seat assembly is mounted on the bottom plate, and the clamping portion or the clamping groove is disposed on the side plate. A folding ear is formed on one end of the side plate away from the bottom plate, a second groove is concavely formed on a top surface of the upper shell, and the folding ear is buckled into the second groove.

In an embodiment, the base is provided with a first side and a second side opposite to the first side. The first protruding portion and the clamping block are located at the first side, the second side is abutted against the bottom plate, and a second protruding portion is disposed at the second side of the base. A first limiting hole is disposed on the base corresponding to the second protruding portion, and the second protruding portion is disposed through the first limiting hole.

In an embodiment, a limiting protrusion is disposed on one side of the base close to the electric control board, and a second limiting hole is provided on the base for the limiting protrusion inserting through.

In an embodiment, the rocker device above includes a magnetic induction assembly. In an embodiment, the magnetic induction assembly includes a Hall element and a magnet, the magnet is mounted on the rocker arm assembly, and the Hall element is disposed on the electric control board corresponding to the magnet and is electrically connected with the electric control board.

In an embodiment, the rocker includes a sliding seat and a rod body fitted with the sliding seat. An installation through hole is formed on the rod body, one end of the sliding seat can extend into the installation through hole.

In an embodiment, an annular groove is formed on one end of a circumference of the rod body close to the sliding seat, and the installation through hole is surrounded by the annular groove. The rocker device further includes a spring, and the spring is sleeved on the sliding seat and extends into the annular groove.

In addition, the present disclosure also provides a handle controller, including the rocker device as described above.

In technical solutions of the present disclosure, the components originally mounted on the bottom shell are mounted on the mounting seat assembly, thereby simplifying the structure of the bottom shell. In addition, through the cooperation between the mounting seat assembly and the bottom shell, the internal structure of the rocker device is more compact, thereby avoiding the rocker device from shaking during use to a certain extent.

BRIEF DESCRIPTION OF THE DRAWINGS

In order to illustrate the technical solutions in the embodiments of the present disclosure or in the related art more clearly, the following briefly introduces the accompanying drawings required for the description of the embodiments or the prior art. Obviously, the drawings in the following description are only part of embodiments of the present disclosure. For those of ordinary skill in the art, other drawings can also be obtained according to the structures shown in these drawings without any creative effort.

Figure 1:
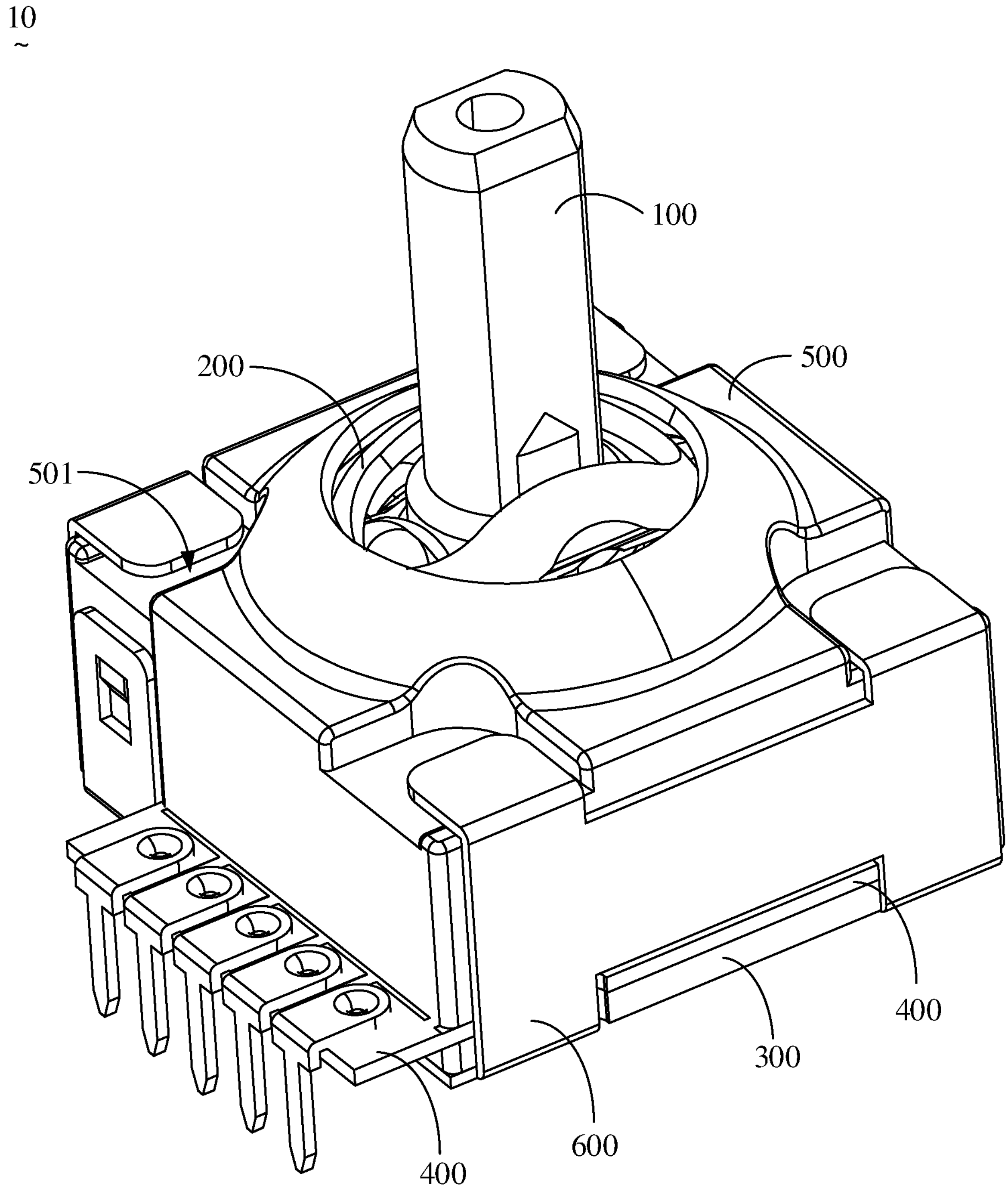
FIG. 1 is a schematic structural view of a rocker device according to an embodiment of the present disclosure.

The achievement of the purpose of the present disclosure, functional characteristics and advantages will be further described with reference to the accompanying drawings in conjunction with embodiments.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there are directional indications, such as up, down, left, right, front, back, etc., involved in the embodiments of the present disclosure, the directional indications are only used to explain a certain posture as shown in the accompanying drawings. If the specific posture changes, the directional indication also changes accordingly.

In addition, if there are descriptions related to "first", "second", etc. in the embodiments of the present disclosure, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. Besides, the meaning of "and/or" appearing in the disclosure includes three parallel scenarios. For example, "A and/or B" includes only A, or only B, or both A and B. In addition, the technical solutions between the various embodiments can be combined with each other, but must be based on the realization by those of ordinary skill in the art. When the combination of technical solutions is contradictory or cannot be realized, it should be considered that the combination of such technical solutions does not exist or fall within the scope of protection claimed in this disclosure.

The present disclosure provides a rocker device.

In an embodiment of the present disclosure, as shown in FIGS. 1 to 9, the rocker device 10 includes a mounting seat assembly 300, an electric control board 400, an upper shell 500 and a bottom shell 600. The mounting seat assembly 300 is provided with a first groove 301 and an arc-shaped groove 302 for mounting a rocker arm assembly 200. The electric control board 400 is arranged in the first groove 301. The upper shell 500 covers a top area of the mounting seat assembly 300, fixes two ends of the rocker arm assembly 200 in the arc-shaped groove 302, and confines the electric control board 400 to the first groove 301. A first connecting portion 510 is provided at an outer periphery of the upper shell 500. The mounting seat assembly 300 is disposed in the bottom shell 600, and the bottom shell 600 is clamped with the first connecting portion 510.

Generally, the rocker device 10 includes a rocker 100, the rocker arm assembly 200 and a sensing component. The rocker arm assembly 200 is sleeved on the rocker 100. The rocker arm assembly 200 is pushed by the rocker 100 to swing in a first direction and a second direction perpendicular to the first direction. The sensing component is used to detect the rocker arm assembly 200 to output a control signal, the sensing component usually being a sensor.

In an embodiment, the sensing component is a magnetic induction assembly 900, which includes a Hall element 910 and a magnet 920. The magnet 920 is mounted on the rocker arm assembly 200, the Hall element 910 is disposed on the electric control board 400 corresponding to the magnet 920 and is electrically connected with the electric control board 400.

Furthermore, the rocker arm assembly 200 includes a first rocker arm 210 and a second rocker arm 220, both are provided with the magnetic induction assembly 900. For ease of description, hereinafter, the magnetic induction assembly 900 disposed on the first rocker arm 210 is the first magnetic induction assembly, and the magnetic induction assembly 900 disposed on the second rocker arm 210 is the second magnetic induction assembly. The second magnetic induction assembly includes a second magnet and a second Hall element. The first Hall element is used to generate and output a first electrical signal corresponding to a change in a distance between the first magnet and the first magnetic induction element caused by a swing of the first magnet, and the second Hall element is used to generate and output a second electrical signal corresponding to a change in a distance between the second magnet and the second magnetic induction element caused by a swing of the second magnet.

In addition, it can be understood that in order to fix two ends of the rocker arm assembly 200 on the arc-shaped groove 302 through the upper shell 500, the upper shell is also provided with an arc-shaped groove, corresponding to the arc-shaped groove 302 on the mounting seat assembly 300. The two arc-shaped grooves cover the two ends of the first rocker arm 210 and the second rocker arm 220.

Figure 3:
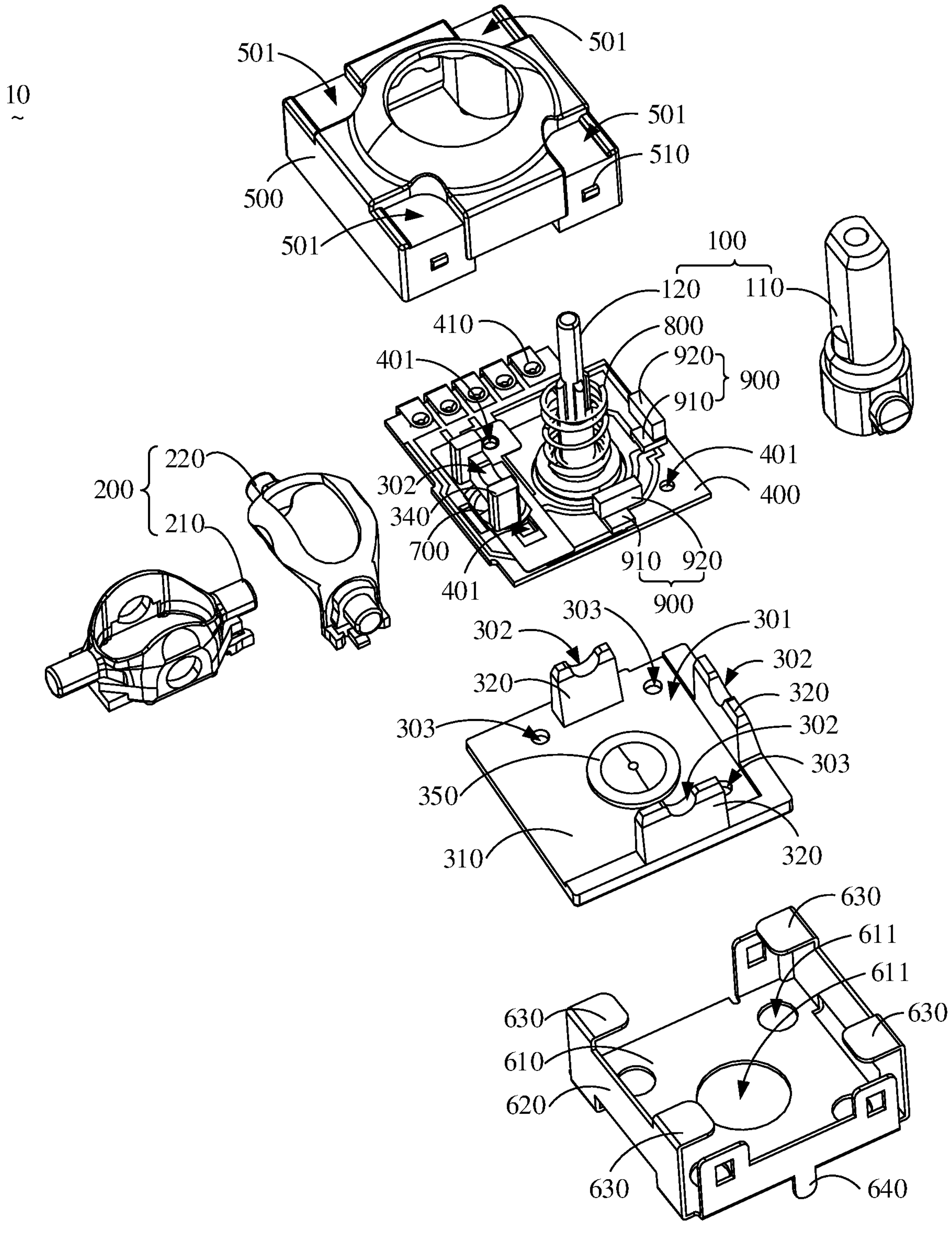
FIG. 3 is an exploded view of FIG. 1.
Figure 4:
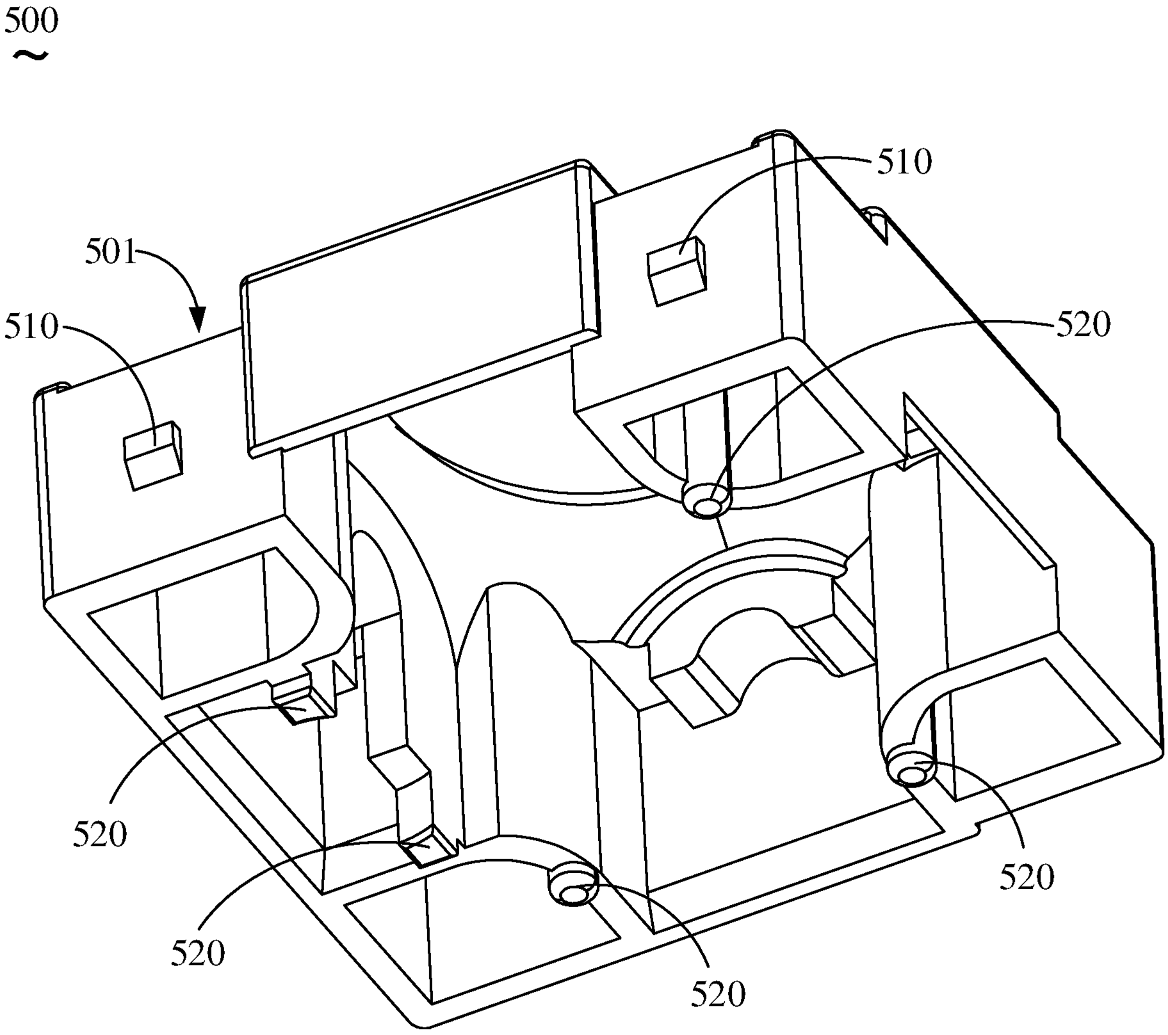
FIG. 4 is a schematic structural view of an upper shell in FIG. 3 according to an embodiment of the present disclosure.
Figure 5:
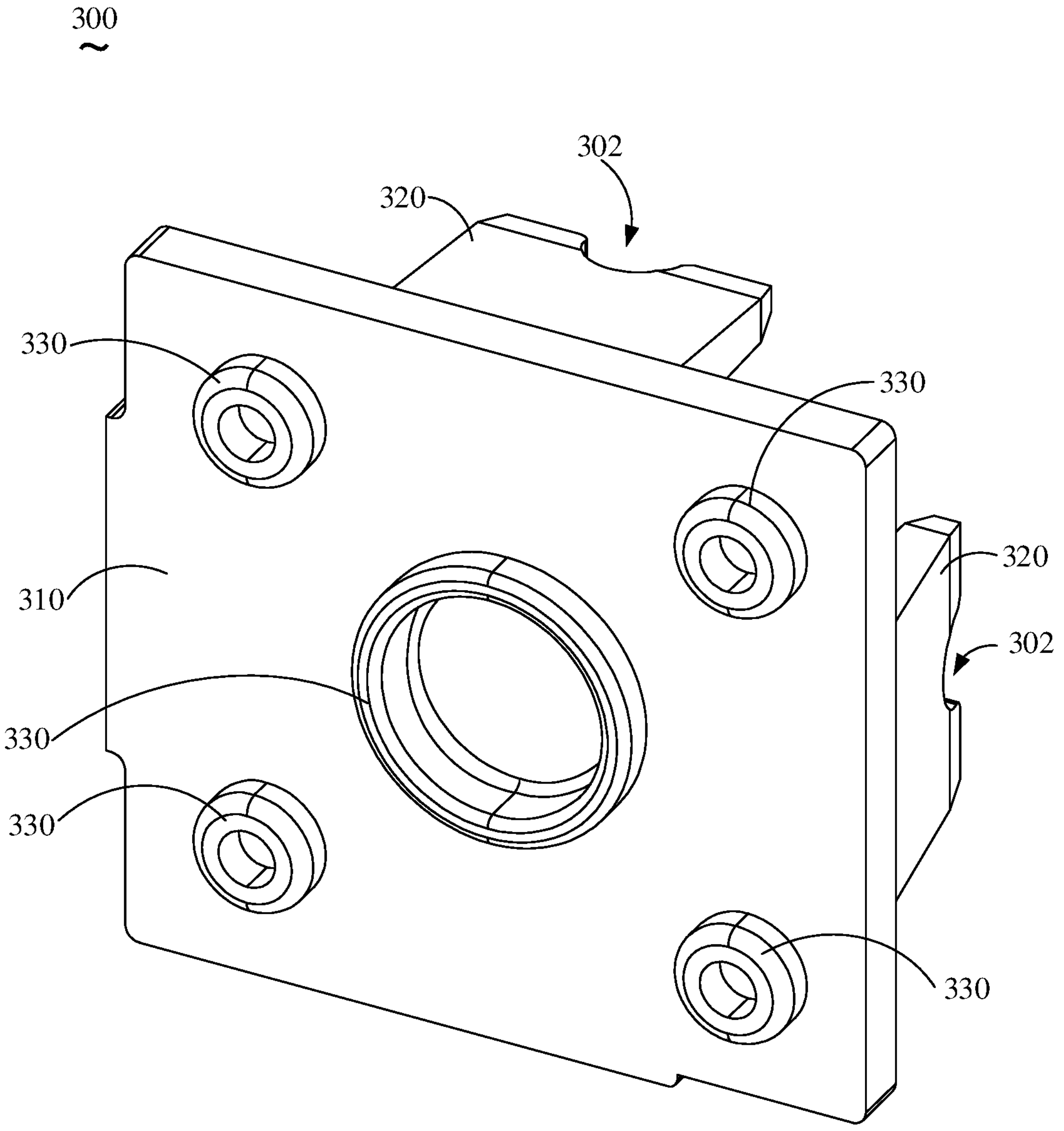
FIG. 5 is a schematic structural view of a mounting seat in FIG. 3 according to an embodiment of the present disclosure.
Figure 6:
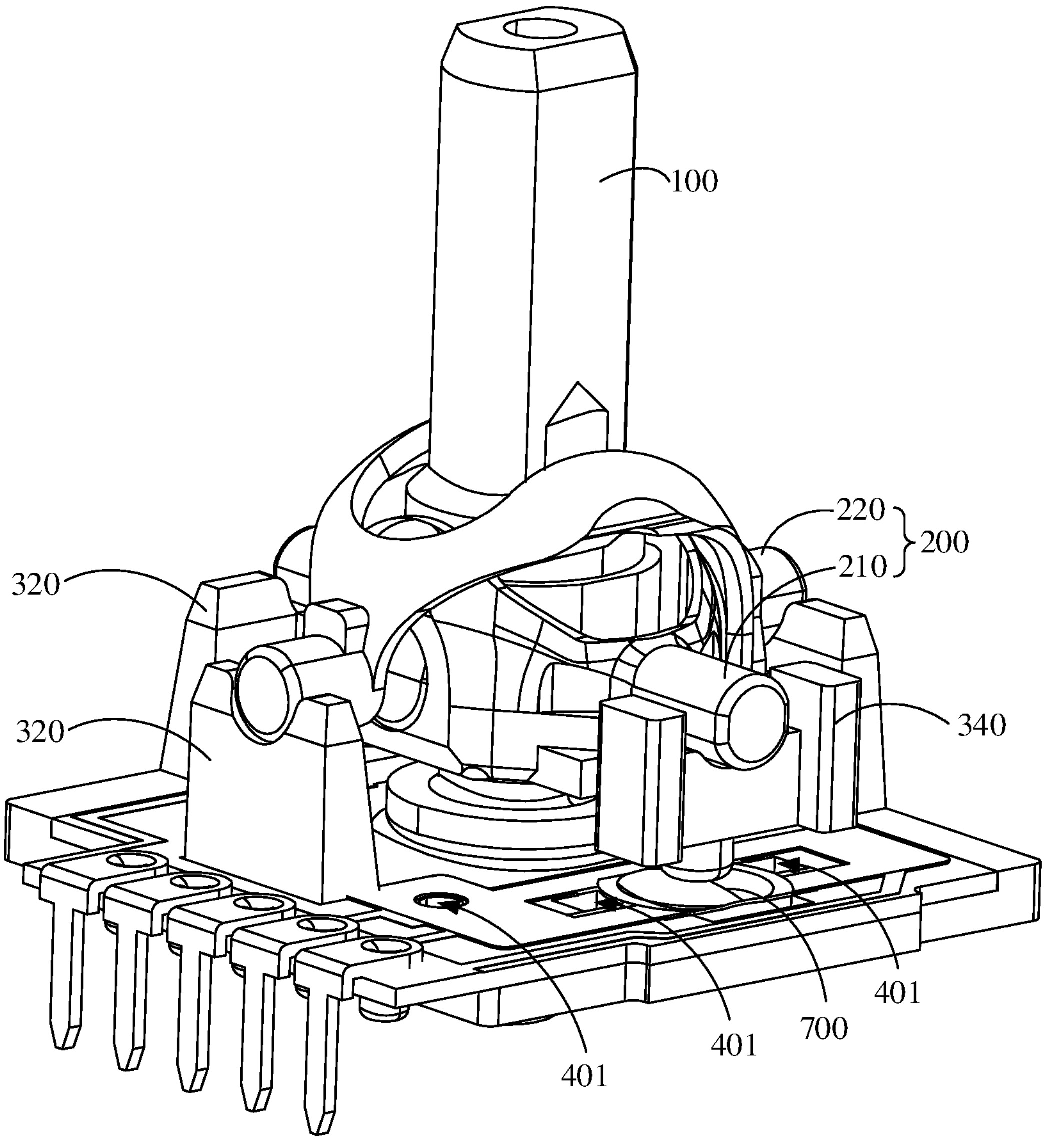
FIG. 6 is a schematic structural view of FIG. 1 which hides an upper shell and a bottom shell.
Figure 7:
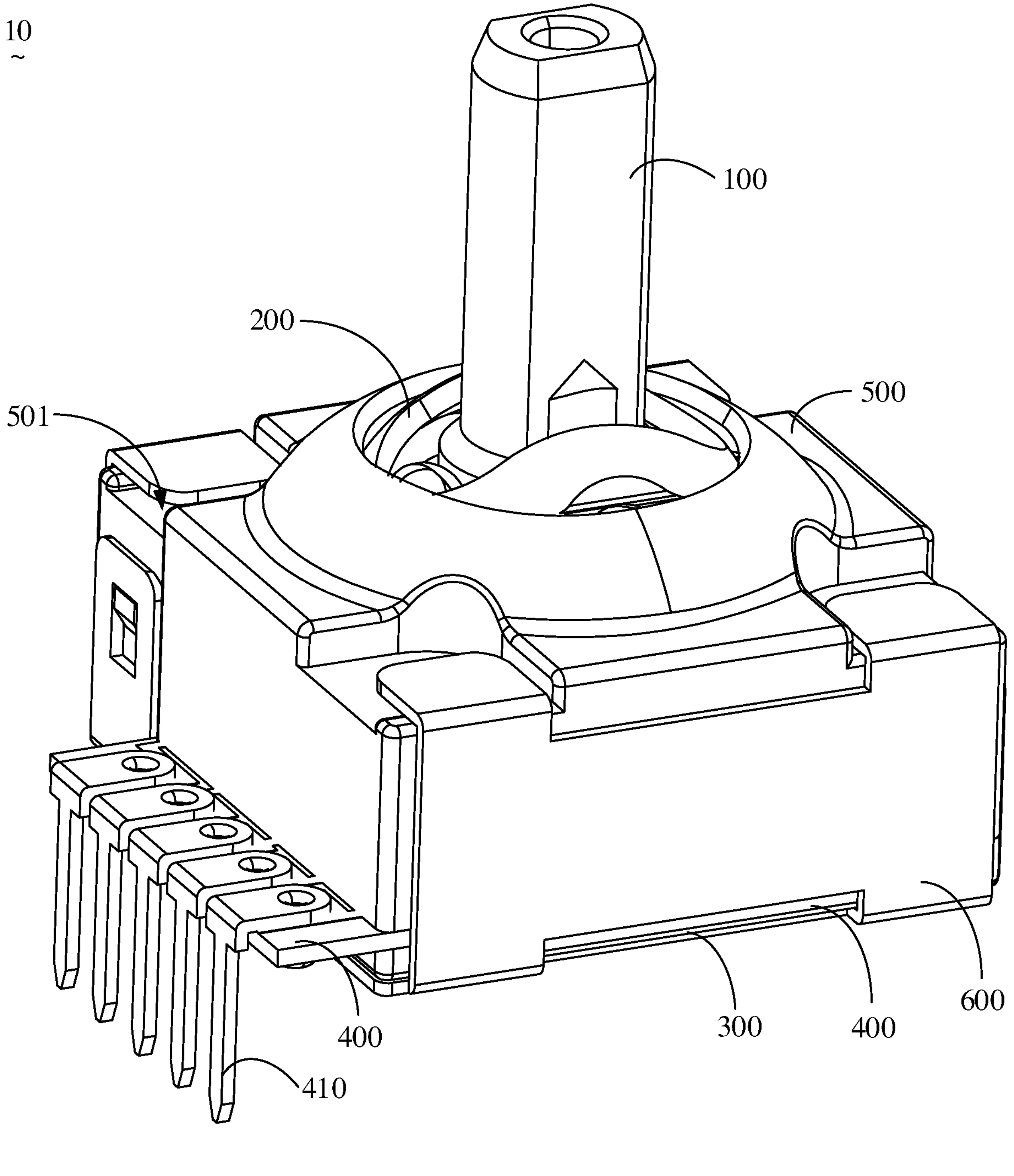
FIG. 7 is a schematic structural view of a rocker device according to another embodiment of the present disclosure.
Figure 8:
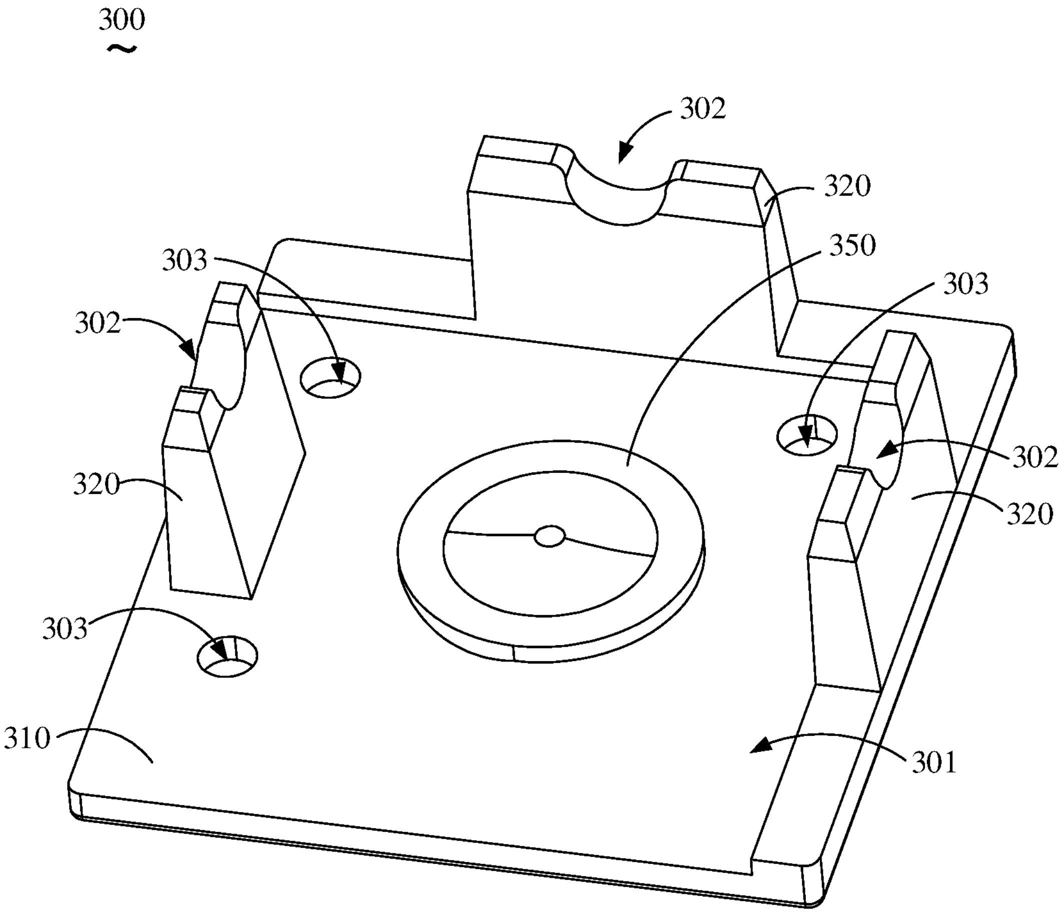
FIG. 8 is a schematic structural view of a mounting seat in FIG. 3 according to another embodiment of the present disclosure.
Figure 9:
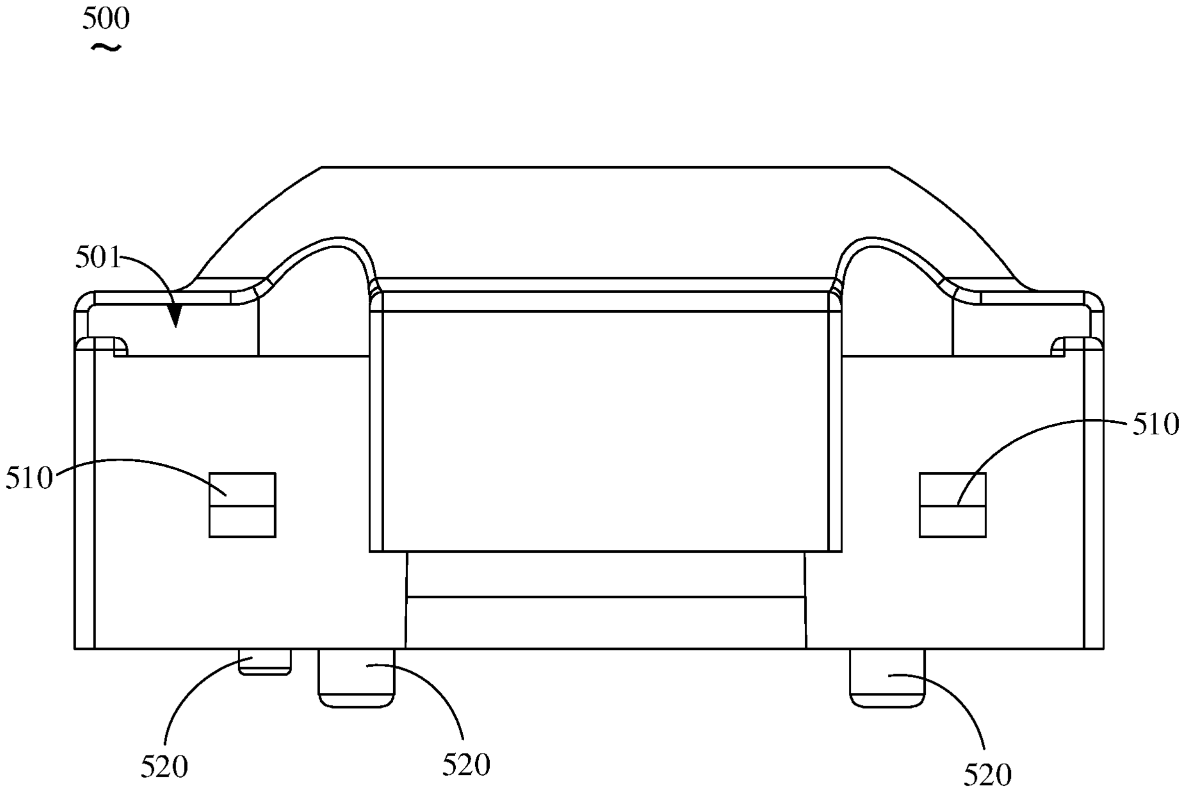
FIG. 9 is a schematic structural view of an upper shell in FIG. 3 according to another embodiment of the present disclosure.

Further, referring to FIG. 3, the mounting seat assembly 300 includes a base 310, a first protruding portion 320 and a clamping block 340. The first protruding portion 320 and the arc-shaped groove 302 are disposed on a same side of the base 310. The arc-shaped groove 302 is formed on one side of the first protruding portion 320 and the clamping block 340 away from the base 310. An elastic sheet 700 is disposed on one side of the electric control board 400 away from the base. The clamping block 340 is movably installed on the upper shell 500 corresponding to the elastic sheet 700, and when the rocker arm assembly 200 is driven by the rocker 100 to press down, the elastic sheet 700 is pressed by the clamping block 340 to be deformed and make the elastic sheet contact with the electric control board 400 to form a loop.

The mounting seat assembly 300 includes three first protruding portions 320, the clamping block 340 and the three first protruding portions 320 are evenly spaced along the circumference of the base 310, and the rocket arm assembly is pushed by the rocker to swing in the first direction and the second direction perpendicular to the first direction.

In an embodiment, in order to facilitate a rapid installation of the bottom shell 600 on the upper shell 500, the first connecting portion 510 is clamped with the upper shell 500.

In an embodiment, the first connecting portion 510 is the clamping portion, and the bottom shell 600 is provided with a clamping groove engaged with the clamping portion.

In an embodiment, the first connecting portion is provided with a clamping groove, and the bottom shell is provided with a clapping portion engaged with the clamping groove. In other embodiments, the bottom shell 600 and the upper shell 500 can also be installed in other manners.

In an embodiment, the electric control board 400, the rocker device 100 and the rocker arm assembly 200 are preinstalled on the mounting seat assembly 300, the upper shell 500 is installed on the mounting seat assembly 300. The upper shell 500 and the mounting seat assembly 300 are locked by the bottom shell 600. Therefore, in technical solutions of the present disclosure, components originally mounted on the bottom shell 600 are mounted on the mounting seat assembly 300, thereby simplifying the structure of the bottom shell 600. In addition, the mounting seat assembly 300 is cooperated with the bottom shell 600, so that an internal structure of the rocker device 10 is more compact, thereby avoiding the rocker device from shaking during use to a certain extent.

Figure 2:
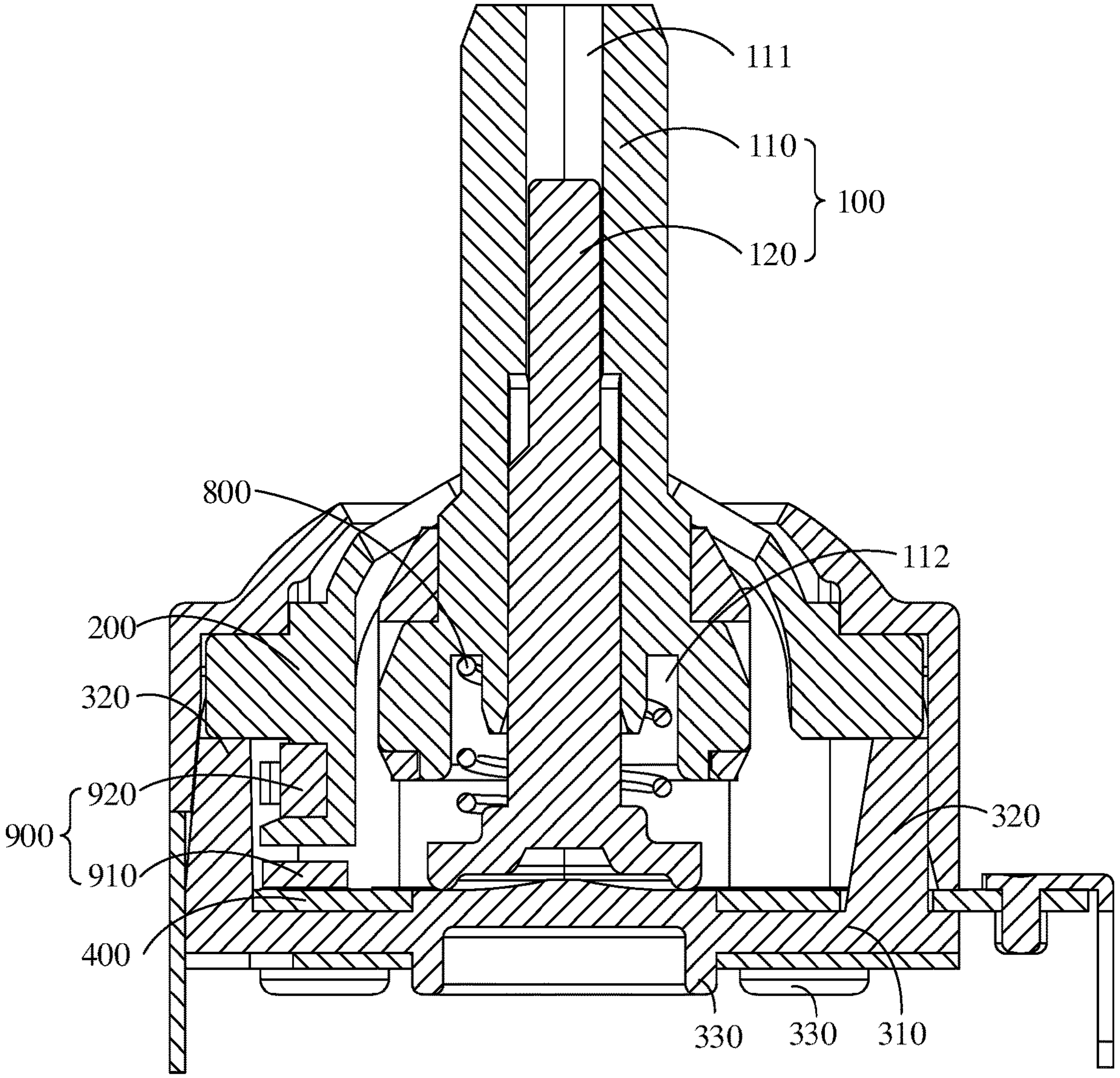
FIG. 2 is a sectional view of FIG. 1.

Referring to FIG. 2, in an embodiment, in order to facilitate an installation of the base 310 and the upper shell 500, an abutting surface of the first protruding portion 320 and the upper shell 500 are inclined.

Referring to FIG. 1 and FIG. 3, in an embodiment, in order to make a connection part of the rocker device 10 more reliable, the bottom shell 600 includes a bottom plate 610 and a side plate 620 connected to the bottom plate 610. The mounting seat assembly 300 is installed on the bottom plate 610, and an engaging portion or the clamping groove is provided on the side plate 620. A folding ear 630 is formed on one end of the side plate 620 away from the bottom plate 610, and a second groove 501 is concavely formed on a top surface of the upper shell 500, in which the folding ear 630 is buckled. In this way, a connection between the bottom shell 600, the upper shell 500, and the mounting seat assembly 300 is strengthened, thereby the connection component of the rocker device 10 can be made more reliable.

In an embodiment, the base 310 is provided with a first side and a second side opposite to the first side. The first protruding portion 320 and the clamping block 340 are located on the first side. The bottom plate 610 is abutted against the second side, on which a second protruding portion 330 is disposed. A first limiting hole is disposed on the bottom plate 610 corresponding to the second protruding portion 330. The second protruding portion 330 is disposed through the first limiting hole 611. In this way, through the second protruding portion 330, a fitting between the base 310 and the bottom shell 600 can be more closely. That applying the rocker device 10 to the controller can be used for positioning, so as to install the rocker device 10 on the controller. In other embodiments, the bottom shell 600 further includes a second connecting portion 640 for a connection with other components of the controller. It can be understood that the electric control board 400 is provided with a pin, through which the electric control board 400 is connected with a printed circuit board (PCB) in the controller.

In an embodiment, a limiting convex 520 is disposed on one side of the upper shell 500 close to the electric control board 400, and a second limiting hole 303 is provided for an inserting of the limiting convex 520. In this way, through the limiting convex 520 and the second limiting hole 303, a mounting relationship between the base 310 and the upper shell 500 can be made more reliable.

It can be understood that, in this embodiment, a third limiting hole 401 is disposed on the electric control board 400 corresponding to the limiting convex 520. The third limiting hole 401 is a through hole, through which the limiting convex 520 extends into the second limiting hole 303. A mating connection of the third limiting hole 401 also confines the electronic control board 400 in the first groove 301.

Referring to FIG. 2, the rocker 100 includes a sliding seat 120 and a rod body 110 fitted with the sliding seat 120. An installation through hole 111 is formed in the rod body 110. One end of the sliding seat 120 is extendingly disposed into the installation through hole 111. In an embodiment, in order to improve a use feeling of the rocker device 10, an annular groove 112 is formed on one end of a circumference of the rod body 110 near the sliding seat 120. The installation through hole 111 is surrounded by the annular groove 112. The rocker device 10 further includes a spring 800 sleeved on the sliding seat 120 and extending into the annular groove 112. In this way, when the rocker 100 is pressed or swung, an end of the spring 800 extending into the annular groove 112 is more evenly stressed with the rocker 100, thereby improving the use feel of the rocker device 10.

In addition, the present disclosure also provides a handle controller, which includes the rocker device 10. The specific structure of the rocker device 10 refers to the above-mentioned embodiments. Because the handle controller adopts all the technical solutions of all the above-mentioned embodiments, at least all the beneficial effects brought by the technical solutions of the above embodiments are provided, which will not be repeated here. The application fields of the handle controller include but are not limited to game handles, drone controllers, VR handles, etc.

The above descriptions are only embodiments of the present disclosure, and are not intended to limit the scope of the present disclosure. Under the inventive concept of the present disclosure, any equivalent structural transformations made by using the contents of the description and drawings of the present disclosure, or direct/indirect disclosures in other related technical fields are included in the scope of patent protection of the present disclosure.

What is claimed is:

1. A rocker device, comprising:

a rocker;

a rocker arm assembly sleeved on the rocker, wherein the rocker arm assembly is pushed by the rocker to swing in a first direction and a second direction perpendicular to the first direction;

a mounting seat assembly, comprising a first groove and an arc-shaped groove for mounting the rocker arm assembly;

an electric control board disposed in the first groove;

an upper shell, covering a top area of the mounting seat assembly, fixing two ends of the rocker arm assembly in the arc-shaped groove, and confining the electric control board in the first groove, a first connecting portion being disposed on an outer periphery of the upper shell; and a bottom shell, wherein the mounting seat assembly is disposed in the bottom shell, and the bottom shell is clamped with the first connecting portion;

wherein the mounting seat assembly comprises a base, a first protruding portion and a clamping block, the first protruding portion and the clamping block are disposed on a same side of the base, and the arc-shaped groove is respectively formed on one side of the first protruding portion away from the base and one side of the clamping block away from the base; and an elastic sheet is disposed on one side of the electric control board away from the base, the clamping block is movably installed on the upper shell corresponding to the elastic sheet, and when the rocker arm assembly is driven by the rocker to press down, the elastic sheet is pressed by the clamping block to be deformed and make the elastic sheet contact with the electric control board to form a loop.

2. The rocker device of claim 1, wherein the mounting seat assembly comprises three first protruding portions, the clamping block and the three first protruding portions are evenly spaced along a circumference of the base, and the rocket arm assembly is pushed by the rocker to swing in the first direction and the second direction perpendicular to the first direction.

3. The rocker device of claim 2, wherein the first protruding portion and an abutting surface of the upper shell are inclined.

4. The rocker device of claim 1, wherein the first connecting portion is a clamping portion, and the bottom shell is provided with a clamping groove engaged with the clamping portion.

5. The rocker device of claim 1, wherein the first connecting portion is provided with a clamping groove, and the bottom shell is provided with a clamping portion engaged with the clamping groove.

6. The rocker device of claim 4, wherein the bottom shell comprises a bottom plate and a side plate connected to the bottom plate, the mounting seat assembly is mounted on the bottom plate, the clamping portion or the clamping groove is disposed on the side plate, a folding ear is formed on one end of the side plate away from the bottom plate, a second groove is concavely formed on a top surface of the upper shell, and the folding ear is buckled into the second groove.

7. The rocker device of claim 4, wherein the base is provided with a first side and a second side opposite to the first side, the first protruding portion and the clamping block are located at the first side, the second side is abutted against the bottom plate, a second protruding portion is disposed at the second side of the base, a first limiting hole is disposed on the base corresponding to the second protruding portion, and the second protruding portion passes through the first limiting hole.

8. The rocker device of claim 2, wherein a limiting protrusion is disposed on one side of the base close to the electric control board, and a second limiting hole is provided on the base for the limiting protrusion inserting through.

9. The rocker device of claim 1, wherein the rocker device comprises a magnetic induction assembly, the magnetic induction assembly comprises a Hall element and a magnet, the magnet is mounted on the rocker arm assembly, and the Hall element is disposed on the electric control board corresponding to the magnet and is electrically connected with the electric control board.

10. The rocker device of claim 9, wherein the rocker comprises a sliding seat and a rod body fitted with the sliding seat, an installation through hole is formed on the rod body, and one end of the sliding seat is configured to extend into the installation through hole.

11. The rocker device of claim 10, wherein an annular groove is formed on one end of a circumference of the rod body close to the sliding seat, the installation through hole is surrounded by the annular groove, the rocker device further comprises a spring, and the spring is sleeved on the sliding seat and extends into the annular groove.

12. A handle controller, comprising the rocker device of claim 1.

* * * * *